United States Patent [19]

Slusarczuk et al.

[11] 4,193,866
[45] Mar. 18, 1980

[54] FERRITE FLOCCULATING SYSTEM

[75] Inventors: George M. J. Slusarczuk, Schenectady; Ronald E. Brooks, Guilderland, both of N.Y.

[73] Assignee: General Electric Company, Schenectady, N.Y.

[21] Appl. No.: 726,961

[22] Filed: Sep. 27, 1976

[51] Int. Cl.² ............................ C02B 1/20; C02C 5/02
[52] U.S. Cl. ...................................... 210/6; 210/42 S; 210/45; 210/53
[58] Field of Search ............... 210/2, 11, 18, 28, 42 S, 210/45, 46, 47, 51-54, 3-6

[56] References Cited

U.S. PATENT DOCUMENTS

| | | | |
|---|---|---|---|
| 2,232,294 | 2/1941 | Urbain et al. | 210/28 |
| 3,218,252 | 11/1965 | Glover et al. | 210/11 |
| 3,697,420 | 10/1972 | Blaisdell et al. | 210/42 S |
| 3,763,038 | 10/1973 | Misaka et al. | 210/53 |

*Primary Examiner*—Charles N. Hart
*Assistant Examiner*—P. A. Hroskoci
*Attorney, Agent, or Firm*—Jane M. Binkowski; Joseph T. Cohen; Leo I. MaLossi

[57] ABSTRACT

A method for removal of insoluble suspended impurities from polluted liquids by adding thereto a magnetic ferrite powder suspendible therein and a polyethyleneimine flocculant which flocculates suspended solid impurities and the magnetic powder producing a dense flocculated mixture.

6 Claims, 1 Drawing Figure

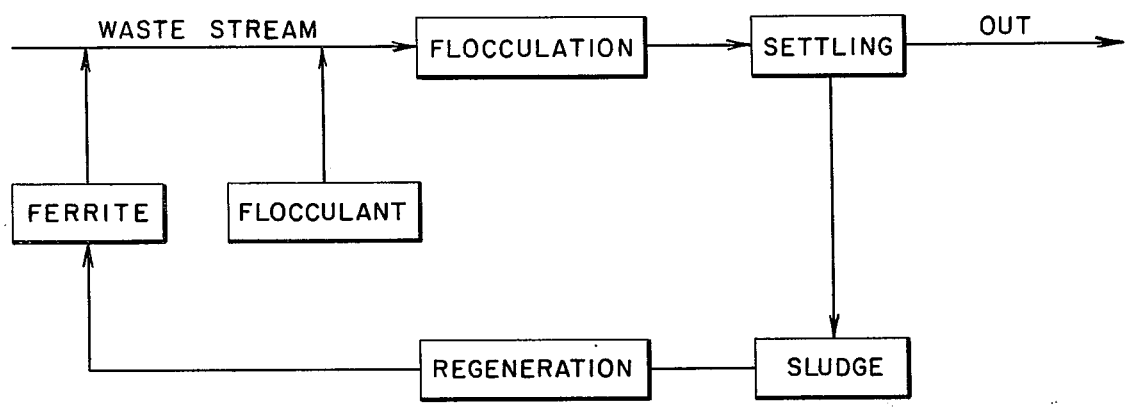

FERRITE FLOCCULATING SYSTEM

The present invention relates to the removal of insoluble impurities from polluted liquids, particularly waste water streams. In the present invention a synergistic waste water flocculating system with magnetic properties is used comprised of ferrite powder and polyethyleneimine flocculant. In one particular aspect it relates to the regeneration and recycling of the ferrite powder by biological or thermal methods.

The addition of "weighing agents" to water and waste water to improve flocculation is not new. It is used mostly in purification of potable water, where bentonite (or similar) clay is added to increase the floc settling speed and efficiency. Addition of magnetic particles to waste water for the purpose of more rapid settling of coagulated floc in a magnetic field is disclosed in U.S. Pat. No. 2,232,294. In the present art addition of weighing agents, such as bentonite or magnetite, to water improves the rate of settling of the floc, but it also adds weight to the sludge and makes disposal of it both more cumbersome and expensive.

Recent innovations by the work of C. de Latour (Second National Conference on Complete Water Reuse, May 8, 1975, paper 30a; IEEE Transactions on Magnetics, MAG-9(3), pp.314–316, 1973) discloses magnetite, $Fe_3O_4$, along with flocculating electrolytes such as the $Al^{+3}$ ion available in aluminum sulfate and discloses the use of the magnetic particle as the nucleus for floc formation and subsequent separation of it by a magnetic filter. But the added magnetic particle has no other effect besides providing a "handle" on the floc.

The present invention relates to a purification method utilizing a magnetic agent whose addition along with a particular flocculating agent has a synergistic effect on flocculation, i.e., causes flocculation at flocculant concentrations below those required for the flocculant when used alone. A particular advantage is that the magnetic agent can be regenerated and reused, thus saving the cost of the agent and its disposal.

Those skilled in the art will gain a further and better understanding of the present invention from the figure accompanying and forming part of the specification wherein the present method for removal of insoluble impurities is illustrated as well as regeneration and recycling of the magnetic agent which is a ferrite powder.

Briefly stated, the present invention relates to the purification of aqueous polluted liquid containing suspended particulate impurities by adding to said liquid a magnetic ferrite powder which is suspendible in the liquid and then adding an aqueous flocculating solution comprised of an aqueous solution of polyethyleneimine for co-flocculating the particulate suspended impurities and the magnetic powder and producing a dense flocculated mixture which settles rapidly in a matter of minutes.

In the present invention the term "ferrite" refers to a magnetic oxide containing iron as a major component. The ferrite is an insoluble and non-toxic material which is inert to aqueous and oxidizing conditions. The term "magnetic" is used herein to indicate a material which is magnetized by a magnetic field. The present ferrite powder has the general formula $Fe_2O_3$-Metal O and preferably, it is selected from the group consisting of $Fe_2O_3MnO$, $Fe_2O_3NiO$, $Fe_2O_3FeO$, $Fe_2O_3CuO$, $Fe_2O_3MgO$, $Fe_2O_3CoO$ and mixtures thereof.

In the present invention the magnetic ferrite powder should be suspendible in the polluted liquid being purified. It has a particulate size ranging from about 200 Angstroms to about 100 microns in diameter and preferably from about 200 Angstroms to about 50 microns in diameter. The amount of magnetic ferrite powder useful in the present process is determinable empirically and will vary depending largely on the amount of suspended particulate impurities present so it can be co-flocculated therewith and enable the resulting flocculated mixture to be settled or handled magnetically. Generally, the smaller the size of the ferrite particle, the less powder need be used since the finer powder provides more contact with the suspended particulate impurities in the polluted liquid. For best results, about 500 parts to about 1000 parts of the ferrite powder are used per million parts of polluted water.

Since the present ferrite powder is magnetic, it provides a "handle" for manipulation. For example, conventional techniques used for manipulating magnetic particles can be used to hold it in place against hydrodynamic or other force, to separate it from a solution by means of "magnetic filters" or to pump and transfer it magnetically.

The aqueous flocculating solution used in the present process consists essentially of an aqueous solution of polyethyleneimine. Polyethyleneimine is a polymer of

It is a viscous hygroscopic liquid in the anhydrous state and it is fully soluble in water. Polyethyleneimine of varying molecular weights can be prepared but these polymers have substantially similar chemical and physical properties, and therefore, in the present process the particular molecular weight of the polyethyleneimine is not critical.

The aqueous solution of polyethyleneimine is prepared and used at room or ambient temperatures and effective concentrations in the present process range from about 0.01 part to about 1 part, and preferably from about 0.05 part to about 0.5 part, of polyethyleneimine per 100 parts of water. Concentrations of the aqueous solution outside this range are not practical due to the large volumes of liquid required or they are not as effective.

The particular concentration and amount of the aqueous polyethyleneimine solution used is determinable empirically and depends largely on the amount of solids to be flocculated. Generally, however, the aqueous polyethyleneimine solution is useful in amounts ranging from a fraction of a part to about 10 parts per million, and preferably from about 0.5 part to about 5 parts per million parts of the polluted liquid.

The present process can be carried out by adding to the polluted aqueous liquid or waste water stream, after only rough settling, the magnetic ferrite powder. The ferrite powder can be added to the polluted liquid by a number of conventional techniques. It need only be added in a manner which allows it to distribute in the polluted liquid substantially uniformly. After the ferrite powder addition, sufficient time should be allowed for the ferrite to become suspended in the polluted liquid, generally about 1 second to 60 seconds.

Once the ferrite powder becomes suspended in the polluted liquid, the aqueous polyethyleneimine solution is added thereto and flocculates the suspended solid impurities as well as the suspended ferrite powder forming a dense flocculated mixture which settles rapidly in a manner of minutes, generally less than 10 minutes. Settling can be substantially speeded up by application of a magnetic field to the resulting flocculated mixture and magnetically settling the mixture. Magnetic settling can be carried out by a number of techniques such as the use of magnetic filters.

In carrying out the present process it is essential that the magnetic ferrite powder be added to the polluted water before the flocculating solution is added to enable the flocculating solution to co-flocculate the suspended particulate impurities and suspended ferrite powder.

The resulting sludge is drained and, if desired, further dewatered in a magnetic field. Specifically, a magnetizing field is applied to the sludge which is sufficiently strong to significantly decrease its volume thereby dewatering it. Such dewatering can be carried out by means of, for example, magnetic filters and magnetic pumps.

In the present process the ferrite powder exhibits synergism with the aqueous polyethyleneimine solution. Specifically, the ferrite powder alone does not effect significant suspended solids removal. In addition, the present polyethyleneimine solution alone at the present concentrations and amounts do not effect substantial suspended solids removal. But used together at least a substantial amount, i.e., at least about 60%, and generally larger amounts of the suspended solid impurities are removed from the polluted liquid. The resulting floc is dense and settles rapidly.

The present process produces a dense flocculated mixture which settles to form a sludge having a volume substantially less, typically about 80% less than the volume of sludge produced with the aqueous polyethyleneimine solution alone. Also, on application of a magnetic field to the sludge produced by the present process, it is further reduced in volume, typically by about 50%.

The ferrite powder can be regenerated, i.e., adsorbed organic matter can be removed therefrom and the particles restored to a condition in which it can be reused with additional flocculant. Specifically, bioregeneration or incineration regenerate the ferrite and restore its synergistic properities with the polyethyleneimine solution. The term bioregeneration, as applied here, refers to digestion by bacteria of organic impurities on or adhering to the ferrite powder and restoration of its synergistic properties in flocculation.

In the following examples, ppm indicates parts per million in MTC, a microbial test culture or synthetic sewage prepared by aerobic mesophilic digestion of a lettuce, urine and salts mixture (120–150 ppm suspended solids), and also, all flocculation experiments were conducted at room temperature on MTC.

EXAMPLE 1

An aqueous polyethyleneimine stock solution was prepared from an aqueous solution of polyethyleneimine ("DOW PEI-1000") which had a 1% polymer content and which was further diluted to give a solution of 0.1 part polyethyleneimine per 100 parts of water hereinafter referred to as the PEI solution.

A magnetic ferrite powder, $Fe_3O_4$ ("Black iron oxide, Fisher I-119") was used which had a particle size ranging from submicron to about 10 microns.

Additions were made in a 150 ml beaker with magnetic stirring. After addition the resulting MTC was transferred to 100 ml volumetric cylinders for settling. Settling time was counted from the transfer. Using a spectrophotomer, the percent removal of suspended solids was determined as percent difference in optical adsorption at a wavelength of 500 nanometers between the supernatant of the sample and raw MTC, with distilled water serving as blank.

Specifically, 100 ml of MTC was placed in a 150 ml beaker, stirred, and the required amount of ferrite added followed by the flocculant and stirring continued for about 30 seconds. Then the contents were transferred to a 100 ml volumetric flask. After appropriate settling time a sample was withdrawn from the top of the cylinder and its optical adsorption determined at 500 nanometers. As a control, MTC was used that settled in a cylinder for the same time.

The results are illustrated in Table I.

TABLE I

| Run | Addition to MTC | % suspended solids removed |
|---|---|---|
| 1 | 5 ppm PEI solution | 0–21 |
| 2 | 10 ppm PEI solution | 0–30 |
| 3 | 1000 ppm ferrite powder + 5 ppm PEI solution | 68 |
| 4 | 1000 ppm ferrite powder + 10 ppm PEI solution | 71 |

Run Nos. 3 and 4 of Table I illustrate the present invention and show a substantial increase in the amount of suspended solids removed when the ferrite powder was used in combination with the polyethyleneimine soluton illustrating the synergism of these materials.

EXAMPLE 2

In this example, all flocculations and measurements were carried out as disclosed in Example 1, except as noted.

This example illustrates the bioregeneration of the ferrite powder from a flocculated sludge produced in a run identical to Run No. 3 of Example 1.

The flocculated sludge was decanted and about one half of the sludge, which was the control sample, was placed in a refrigerator. The remaning sludge was transferred to a 125 ml Erlenmeyer flask to which was added 50 ml of ⅓ concentration of PAS inoculated with a mesophilic flora acclimated to aqueous polyethyleneimine solution, and the mixture was incubated at room temperature overnight. PAS is an inorganic solution containing phosphorus, ammonia and salts commonly used in bacteriology. After such incubation, the sample was centrifuged. This bioregenerated ferrite powder was reused for flocculation. Specifically, in this instance 1000 ppm of the bioregenerated ferrite powder were added to the MTC followed by addition of 5 ppm of the PEI solution. It was determined that 70% of the suspended solids were removed. The process was repeated four times on the same sample of ferrite, but on subsequent regenerations no inoculation was used. Bioregeneration of the ferrite powder was observed in all cases.

The refrigerated control sample was also centrifuged and the resulting control ferrite material reused for flocculation. Using 1000 ppm of the control with 5 ppm of the PEI solution, it was determined that only 40% of the suspended solids were removed.

For purposes of comparison, 1000 ppm of a virgin ferrite powder, the magnetic ferrite powder disclosed in Example 1, along with 5 ppm of the PEI solution were used for flocculation and it was determined that 65% of the suspended solids were removed.

This example illustrates that the bioregenerated ferrite performed 50–100% better than the control and about as good as the virgin ferrite.

EXAMPLE 3

In this example, all flocculations and measurements were carried out as disclosed in Example 1, except as noted.

This example illustrates the thermal regeneration of the ferrite powder from a flocculated sludge produced in Run No. 3. The flocculated sludge was centrifuged, placed in a combustion boat and heated in a furnace in air at 500° C. overnight. The resulting ferrite powder was cooled to room temperature and appeared to be free of organic matter. This combustion regenerated ferrite was reused for flocculation. Specifically, in this instance 1000 ppm of the regenerated ferrite powder were added to the MTC followed by addition of 5 ppm of the PEI solution. It was determined that 62% of the suspended solids were removed.

For purposes of comparison, 1000 ppm of virgin ferrite powder, the magnetic ferrite powder disclosed in Example 1, along with 5 ppm of the PEI solution were used for flocculation and it was determined that 64% of the suspended solids were removed.

This example illustrates the substantially full regeneration of the combusted ferrite powder.

The following cited copending patent applications are, by reference, made part of the disclosure of the present application.

In copending U.S. patent application Ser. No. 726,962 entitled "Magnetic Adsorbent And Flocculant" filed of even date herewith in the names of George M. J. Slusarczuk and Ronald E. Brooks and assigned to the assignee hereof, there is disclosed a method for simultaneous removal of soluble and insoluble impurities from polluted liquids by adding thereto a magnetic adsorbent composite powder which adsorbs soluble organic impurities and a flocculant which flocculates suspended solid impurities and the magnetic powder and magnetically settling the flocculated mixture.

In copending U.S. patent application Ser. No. 726,963 entitled "High Density Carbon Adsorbent Composite" filed of even date herewith in the names of George M. J. Slusarczuk and Ronald E. Brooks and assigned to the assignee hereof, there is disclosed an adsorbent composite composed of a high density substrate particle which is non-reactive under conditions of use and which is encapsulated with adherent activated carbon.

In copending U.S. patent application Ser. No. 726,960 entitled "Magnetic Adsorbent Composite" filed of even date herewith in the names of George M. J. Slusarczuk and Ronald E. Brooks and assigned to the assignee hereof, there is disclosed a magnetic adsorbent composite composed of a magnetic substrate particle which is non-reactive under conditions of use and which is encapsulated with adherent active carbon.

What is claimed is:

1. A method for purifying an aqueous polluted liquid containing particulate suspended impurities by removing at least 60% of said particulate suspended impurities therefrom, which comprises suspending and distributing a magnetic ferrite powder in said polluted liquid substantially uniformly in an amount ranging from about 500 parts to about 1000 parts per million parts of said polluted liquid, said magnetic ferite powder being a magnetic oxide containing iron as a major component and having the general formula $Fe_2O_3$-Metal O, said magnetic ferrite powder being suspendible in said polluted liquid and ranging in diameter from about 200 Angstroms to about 100 microns, after said magnetic ferrite powder has been distributed and suspended within said polluted liquid adding to said polluted liquid an aqueous flocculating solution in an amount which co-flocculates said suspended particulate impurities and said suspended magnetic ferrite powder forming a dense flocculated mixture which settles forming a sludge, and separating said sludge, said aqueous flocculating solution consisting essentially of about 0.01 part to 1 part of polyethyleneimine per 100 parts of water, and said aqueous flocculating solution being used in an amount ranging from about 0.5 part to about 10 parts per million parts of said polluted liquid.

2. A method according to claim 1 wherein said magnetic ferrite particles range in diameter from about 200 Angstroms to about 50 microns.

3. A method according to claim 1 wherein said aqueous flocculating solution consists essentially of about 0.1 part to about 0.5 part of polyethyleneimine per 100 parts of water.

4. A method according to claim 1 wherein a magnetizing field is applied to said flocculated mixture to magnetically settle said mixture.

5. A method according to claim 1 wherein said separated sludge is biologically treated causing removal of impurities and bioregeneration of the magnetic ferrite powder.

6. A method according to claim 1 wherein said separated sludge is thermally treated causing removal of impurities and regeneration of the magnetic ferrite powder.

* * * * *